US010950239B2

(12) United States Patent
Lin et al.

(10) Patent No.: US 10,950,239 B2
(45) Date of Patent: Mar. 16, 2021

(54) SOURCE-BASED AUTOMATIC SPEECH RECOGNITION

(71) Applicant: Avaya Inc., Santa Clara, CA (US)

(72) Inventors: Lin Lin, Belleville (CA); Ping Lin, Belleville (CA)

(73) Assignee: Avaya Inc., Santa Clara, CA (US)

( * ) Notice: Subject to any disclaimer, the term of this patent is extended or adjusted under 35 U.S.C. 154(b) by 509 days.

(21) Appl. No.: 14/920,021

(22) Filed: Oct. 22, 2015

(65) Prior Publication Data
US 2017/0116991 A1    Apr. 27, 2017

(51) Int. Cl.
| | |
|---|---|
| *G10L 15/30* | (2013.01) |
| *G10L 15/22* | (2006.01) |
| *G10L 15/32* | (2013.01) |
| *G06F 40/58* | (2020.01) |

(52) U.S. Cl.
CPC .............. *G10L 15/30* (2013.01); *G06F 40/58* (2020.01); *G10L 15/22* (2013.01); *G10L 15/32* (2013.01); *G10L 2015/226* (2013.01)

(58) Field of Classification Search
CPC ........................................................ G06F 17/28
USPC ...................................................... 704/9, 270
See application file for complete search history.

(56) References Cited

U.S. PATENT DOCUMENTS

| | | | | |
|---|---|---|---|---|
| 5,865,626 | A * | 2/1999 | Beattie ................... | G09B 19/04 434/185 |
| 2003/0125947 | A1 | 7/2003 | Yudkowsky | |
| 2004/0111259 | A1* | 6/2004 | Miller ..................... | G10L 15/19 704/231 |
| 2006/0095266 | A1* | 5/2006 | McA'Nulty ............ | G10L 15/30 704/270.1 |
| 2006/0122840 | A1* | 6/2006 | Anderson .............. | G10L 13/033 704/275 |
| 2006/0149558 | A1* | 7/2006 | Kahn ..................... | G10L 15/063 704/278 |
| 2006/0195323 | A1* | 8/2006 | Monne .................... | G10L 15/30 704/270.1 |
| 2007/0165554 | A1* | 7/2007 | Jefferson ........... | H04M 3/42263 370/315 |
| 2011/0077934 | A1* | 3/2011 | Kanevsky ............. | G06F 17/289 704/3 |
| 2012/0179471 | A1* | 7/2012 | Newman ................. | G10L 15/30 704/270.1 |

(Continued)

OTHER PUBLICATIONS

"Distributed Speech Recognition," ETSI, 2015, 2 pages [retrieved online from: https://web.archive.org/web/20150515222338/http://www.etsi.org/technologies-clusters/technologies/past-work/speech-recognition].

(Continued)

*Primary Examiner* — Jakieda R Jackson
(74) *Attorney, Agent, or Firm* — Sheridan Ross P.C.

(57) ABSTRACT

Recognizing a user's speech is a computationally demanding task. If a user calls a destination server, little may be known about the user or the user's speech profile. The user's source system (device and/or server) may have an extensive profile of the user. As provided herein, a source device may provide translated text and/or speech attributes to a destination server. As a benefit, the recognition algorithm may be well tuned to the user and provide the recognized content to the destination. Additionally, the destination may provide domain attributes to allow the source recognition engine to better recognize the spoken content.

6 Claims, 4 Drawing Sheets

(56) References Cited

U.S. PATENT DOCUMENTS

| | | | | |
|---|---|---|---|---|
| 2013/0132089 A1* | 5/2013 | Fanty | ................... | G10L 21/00 |
| | | | | 704/270 |
| 2013/0152092 A1* | 6/2013 | Yadgar | ............... | H04M 3/4936 |
| | | | | 718/102 |
| 2014/0164317 A1* | 6/2014 | Lynch | .................. | G06Q 10/02 |
| | | | | 707/609 |
| 2014/0278416 A1* | 9/2014 | Schuster | ............... | G10L 15/32 |
| | | | | 704/246 |
| 2014/0297288 A1* | 10/2014 | Yu | ..................... | H04M 1/72519 |
| | | | | 704/275 |
| 2016/0359994 A1* | 12/2016 | Liu | ....................... | H04L 43/16 |

OTHER PUBLICATIONS

"Speech recognition," Wikipedia, last updated Jun. 20, 2015, 10 pages [retrieved online from: https://web.archive.org/web/20150621065028/https://en.wikipedia.org/wiki/Speech_recognition].

Chang et al. "CSR: A Cloud-Assisted Speech Recognition Service for Personal Mobile Device," 2011 International Conference on Parallel Processing (ICPP), Sep. 2011, 3 pages (Abstract Only).

Pearce "Distributed Speech Recognition," W3C, 2005, 11 pages [retrieved online from: http://www.w3.org/2005/05/DSR.pdf].

Peinado et al. "Speech Recognition over digital channels: Robustness and Standards," John Wiley & Sons, Ltd., 2006, Introduction, pp. 1-3.

Xie et al. "RTP Payload Formats for European Telecommunications Standards Institute (ETSI) European Standard ES 202 050, ES 202 211, and ES 202 212 Distributed Speech Recognition Encoding," Network Working Group, RFC 4060, May 2005, 19 pages.

\* cited by examiner

SOURCE-BASED AUTOMATIC SPEECH RECOGNITION

FIELD OF THE DISCLOSURE

The present disclosure is generally directed toward computer recognition of human speech.

BACKGROUND

It is very useful in many unified communication applications to be able to recognize free-form speech. Natural-language interfaces enhance the features and usability of mobile applications, conference systems, voice mail transcription applications, and many other applications. Large vocabulary, speaker-independent speech recognizers are typically used in many applications. However, free-form speech produces a word error rate that is high, often unacceptably high, in these recognizer deployments, especially in transcription applications where the domain of words is often unlimited.

Often speech recognition systems can restrict a domain of words based upon an application. A smart phone (e.g., a cellular telephone with computational functionality) may understand basic commands when not connected to a host server. For example, a smart phone may have enough of a vocabulary to be able to detect the word "play" or "call" and parse the speech that follows. As a result, the smart phone may then access the music or contact list stored on the device and determine that the user wishes to play a particular song or place a call to a number in the contact list. Free-form speech is more complex and requires the vocabulary and computational power that is prohibitively large and unwieldy for a handheld device and generally requires offloading the process to an offsite server.

Many free-form speech systems of the prior art require significant memory and processing power and/or access to additional computational resources in order to be effective. However, even with access to the computational power required, often training is required to allow such systems to familiarize themselves with a particular user's speech.

Centralized systems, such as a conferencing system or contact center receiving calls, may have more extensive data processing capabilities. However, such systems have the disadvantage of having to determine the speech from a variety of callers. Even if callers self-identify as speaking a particular language, callers may have accents, dialects, idioms, and other differences in their speech that makes speech recognition challenging. Such systems generally have limited opportunity to be trained or tuned to a particular user's speech. Fortunately, many systems rely on a limited vocabulary determined in association with the call. For example, an automated airline reservation system may be tuned to anticipate words and phrases associated with air travel or travel in general. However, if a user deviates from the catalog of predicted words, they are often informed that their request cannot be understood and are routed to a human agent. Despite the advantages of such systems, problems remain.

SUMMARY

It is with respect to the above issues and other problems that the embodiments presented herein were contemplated. Turning spoken words into a machine-understandable form or even text is one of the most challenging tasks for any computing system. By way of general introduction, embodiments disclosed herein allow for a user device and a destination server to negotiate who, and to what extent, recognition services are provided by the user device and the destination server. Recognition may be shared whereby the user device provides attributes and/or certain translated text to the destination server. As a benefit, the destination server and/or the user device may select an acoustic model for a particular user and/or domain, without requiring the user to speak.

In one embodiment, the source (user device and/or server) and the destination (destination server) dynamically negotiate who performs speech recognition so that it is possible for the source to perform speech recognition, entirely or partially, rather than requiring all recognition services to be performed by the destination. In another embodiment, a Real-Time Transport Protocol (RTP) text stream is provided by the source to convey recognition results to the destination In another embodiment, the destination may convey word sequence constraints (e.g., grammars, n-grams) to the source. If recognition is to be performed by the source, the source may utilize the word sequence constraints in its recognition process. In one embodiment, the source is a smart phone, computer, or other personal communication device of a user. In another embodiment, the source comprises a server, such as an Internet protocol (IP) Private Branch Exchange (PBX) or other user-side host.

In another embodiment, the user's PBX hosts provides the speech recognition services (the "recognizer"). When the user is first added to the PBX system, a generic or default acoustic model(s) may be associated with the user for recognition. For example, users in the US and the UK may start with American English and British English acoustic models, respectively.

Over time, the user makes calls to or utilizing the PBX host system allowing for their voice and speech to be monitored and used for adaptations to the default models, such as by using a maximum likelihood linear regression (MLLR) algorithm. These adaptations may then be saved in the user's profile and deployed in future recognitions to further reduce the word error rate.

When a user first calls a destination endpoint, a destination or destination server may answer the call. The destination endpoint, as this is a first encounter with the caller, has only default information regarding the speech of the user. For example, an area of origin associated with the number, which may, or may not, accurately reflect the speech attributes of the caller. However, the user-side components (device and/or IP PBX) know the specific identity of the caller and may even have a speech profile for the caller. For example, the caller may log in using an endpoint to access an IP PBX. The IP PBX may then be able to use the caller's acoustic model and/or the appropriate lexicon for the dialect.

In one embodiment, a host server is disclosed, comprising: a network interface to a communications network; a microprocessor having access to the network interface; and the microprocessor, via the network interface, engages in a call with a destination server, the call comprising a machine-readable recognition of a spoken portion provided by the source user; and wherein the microprocessor executes instructions in accordance with the content of the voice call provided by the machine-readable recognition of the speech portion.

In another embodiment, a source server is disclosed, comprising: a network interface to a communications network; a microprocessor having access to the network interface; and the microprocessor, via the network interface, hosts a call between a source user and a destination endpoint; and the microprocessor monitors the call and provides a machine-readable recognition of a spoken portion, provided by the source user, to the destination endpoint.

In another embodiment, a method is disclosed, comprising: establishing a call between a source endpoint and a destination server; indicating an ability to perform speech recognition at a processing component associated with the source endpoint; monitoring, by the processing component, the call for speech provided to the source endpoint; analyzing, by the processing component, the speech to provide a machine-readable content of a portion of the speech; and providing, by the processing component, the machine-readable content of the portion of the speech to the destination server.

Terms "source" and "destination" are used herein as a convenience. Although the user, via the source device and/or server, may place a call to the destination, in other embodiments the destination may initiate the call to the source (e.g., callback, etc.).

The terms "caller" and "user" may be used interchangeably herein and refer to the human utilizing a source endpoint (e.g., analog or digital telephone, cellular phone, softphone, etc.), which, in turn, is associated with a source component facilitating connectivity to a communications network (e.g., Internet, PSTN, etc.). The source component being hardware and/or software, which may operate as a PBX or IP PBX.

The term "source" indicates components or individuals on a first side of a communication network, which generally, but not necessarily, places a call or otherwise is operable to engage in a call with a destination endpoint or destination server.

The term "destination" or "host" may be used to indicate components or individuals on a second side of a communication network, which generally, but not necessarily, receives a call or otherwise is operable to engage in a call over the communications network with a source endpoint or source server associated with a source endpoint.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
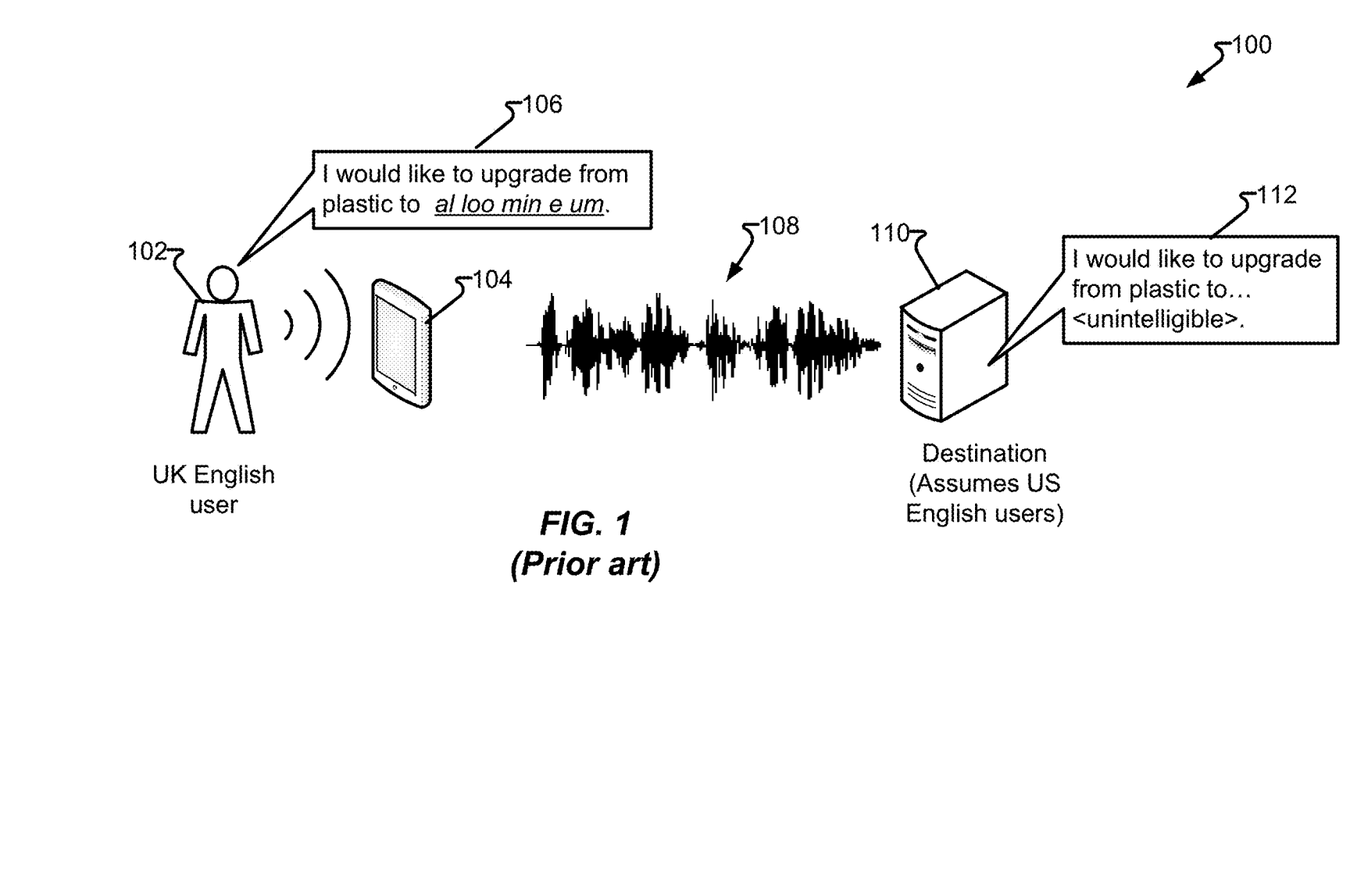
FIG. 1 depicts a first interaction in accordance with the prior art.

FIG. 1 depicts interaction 100 in accordance with the prior art. Interaction 100 presents a common occurrence in the prior art, wherein user 102 utilizing device 104 places a call to destination server 110. Destination server 110 has little or no knowledge of user 102 and performs speech recognition on waveform 108 received over a network utilizing a default set of speech attributes. User 102 provides spoken content 106, thereby providing the content of waveform 108, which is then recognized by a speech recognition algorithm of destination server 110 to derive recognized content 112. However, speaker 102 may speak in a particular manner (e.g., UK English) while destination server 110 assumes the speaker manner is appropriate for a default or other acoustic model (e.g., US English). For example, proper UK pronunciation of aluminum may not be recognized by an algorithm attempting to perform speech recognition with the assumption that the caller is speaking US English. As a result, the speech recognition error rate provided by server 110 may be unacceptably high.

Figure 2:
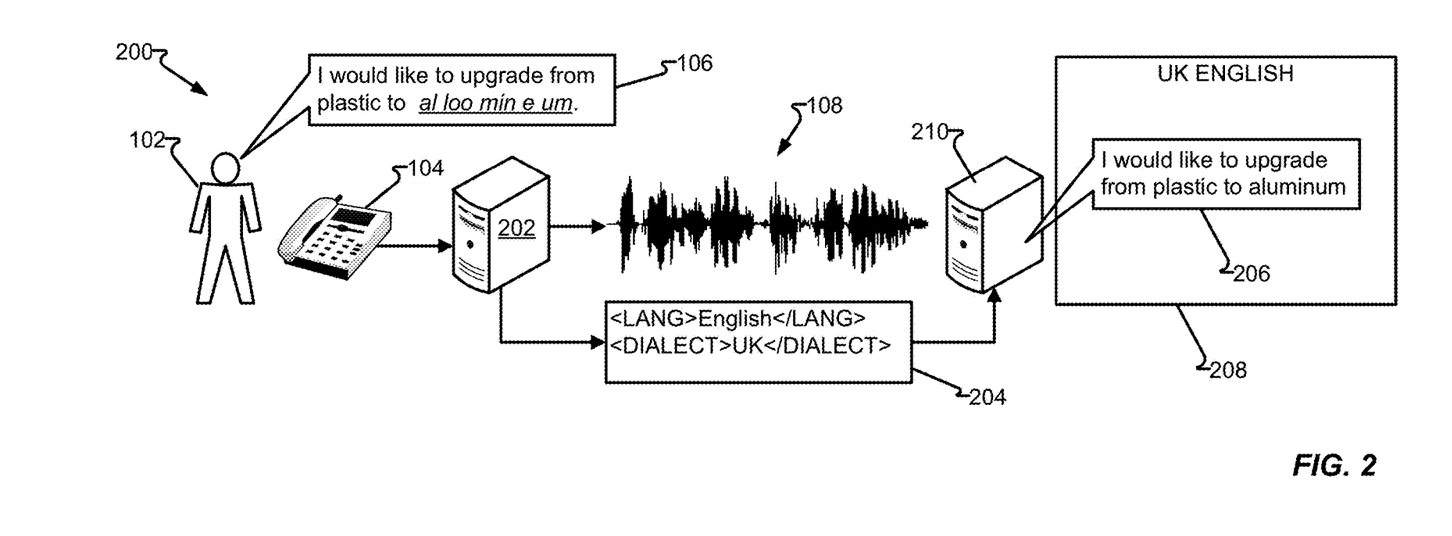
FIG. 2 depicts a second interaction in accordance with embodiments of the present disclosure.

FIG. 2 depicts interaction 200 in accordance with embodiments of the present disclosure. In one embodiment, source server 202 provides cues, such as speech attributes 204, to destination server 210 to be used to seed a recognition algorithm utilized by destination server 210 to recognize spoken content 106 provided by user 102. User 102 utilizes device 104, and optionally utilizes source server 202, to place and receive calls to destination server 210. Destination server 210 receives waveform 108 comprising spoken content 106. The call set up between source server 202 and destination server 210 may comprise the establishment of the second data channel, such as an RTP channel, whereby speech attributes 204 associated with user 102 are provided to destination server 210.

Destination server 210, upon receiving speech attributes 204, selects an appropriate acoustic model, such as acoustic model 208, to a recognition algorithm associated with the translation of spoken content 106 received via waveform 108. With the benefit of speech attributes 204, destination server 210 to produce recognized content 206.

It should be appreciated that the difference between spoken content 106, such as provided by waveform 108, and recognized content 206 is the data-type provided. For example, waveform 108 may be captured as a sound format, such as AVI, MP3, etc. Whereas, recognized content 206 may be maintained not as a waveform representation sound but as a textual representation of language elements (e.g., words, phrases, etc.). In other embodiments, recognized content 206 may be associated with standard computer representations of text (e.g., ASCII, EBCDIC, etc.), which, when presented by a computing device's display, may be considered a human-readable format.

Speech attributes 204 are variously embodied and may comprise one or more attributes associated with the speech provided by user 102. Speech attributes 204 then may be passed on a data channel, such as a RTP channel, from source server 202 to destination server 210. Speech attributes 204 may include, for example, language, dialect, accents, etc. In one embodiment, speech attributes 204 are provided via a session initiation protocol (SIP) message, which may further comprise extensible markup language (XML) formatting. With the benefit of speech attributes 204, destination server 210 may provide the acoustic model 208 to understand the word "aluminum," for example, when provided by user 102 having a UK dialect.

Figure 3:
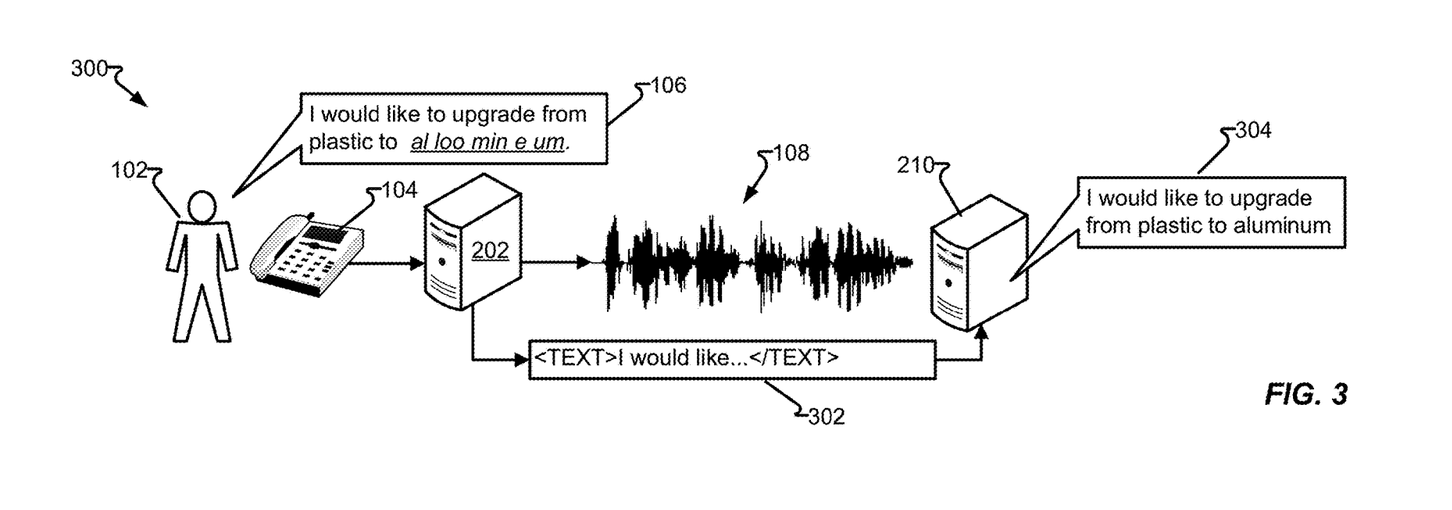
FIG. 3 depicts a third interaction in accordance with embodiments of the present disclosure.

FIG. 3 depicts interaction 300 in accordance with embodiments of the present disclosure. In another embodiment, source server 202 establishes a connection with destination server 210 to provide waveform 108 and recognize text 302, such as via a data channel. Recognized text 302 may result from source server 202 performing the entirety of the speech recognition process.

In another embodiment, server 202, based upon prior sampling of speech provided by user 102, has associated therewith the user profile, including speech attributes, associated with user 102. For example, user 102 may have server 202 for prior calls or interactions with server 202 as a source of the prior sampling. Optionally, destination server 210 may provide source server 202 with language domain attributes such as to seed an algorithm associated with source server 202 to improve performance and/or accuracy of speech provided by user 102 as it relates to a particular domain. The domain being known, for example, by an attribute associated with destination server 210.

For example, destination server 210 may be associated with a particular product, such as one having plastic or aluminum cases, and provide the vocabulary and/or attributes associated with the product to server 202 to improve the accuracy and/or performance of the speech recognition process. The result of the recognized speech 304 is then being passed by a recognize text 302 to destination server 210. Destination server 210, then maintains recognized speech 304, without requiring additional processing, to determine the speech provided. As a further embodiment, waveform 108 may be superfluous and therefore omitted or ignored.

Figure 4:
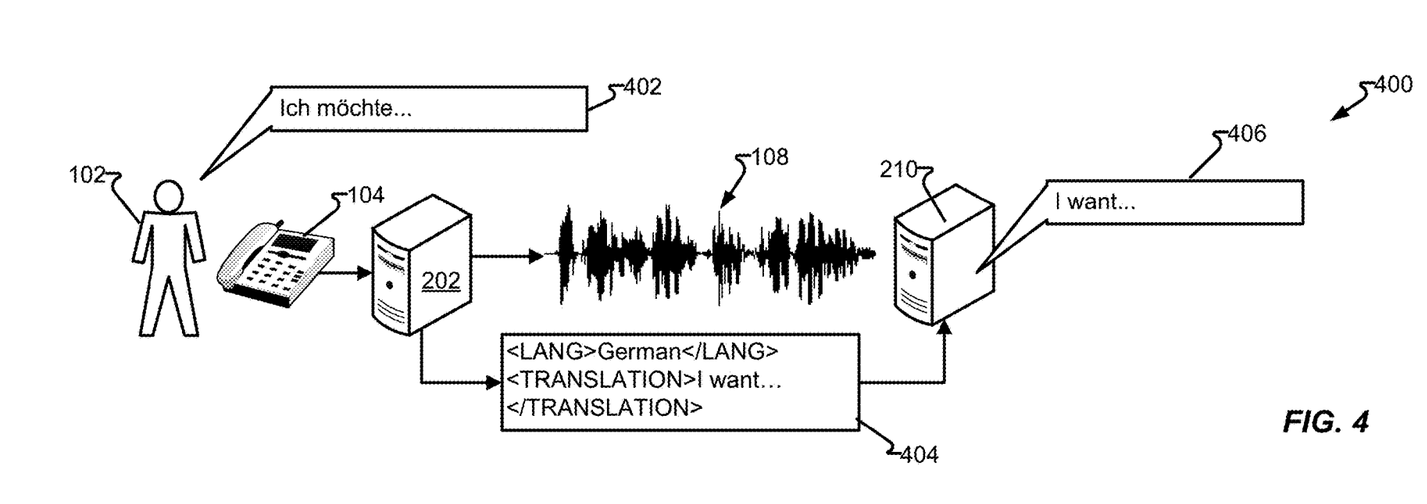
FIG. 4 depicts a fourth interaction in accordance with embodiments of the present disclosure.

FIG. 4 depicts interaction 400 in accordance with embodiments of the present disclosure. In one embodiment, user 102 provides spoken content 402 in a language, which may be different from what is expected by destination server 210. Source server 202 may provide language attributes 404 in order for destination server 210 to recognize speech provided by waveform 108 and translate the speech into destination server language 406.

In another embodiment, spoken content 402 may be provided by translated text, which is both translated and recognized by source server 202. Spoken content 402 then comprises text in a translated format that is sent to destination server 210. Destination server 210 then processes translated and recognized text 406 without requiring additional processing. In yet another embodiment, source server 202 may be seeded with vocabulary and/or other language attributes received from destination server 210.

Figure 5:
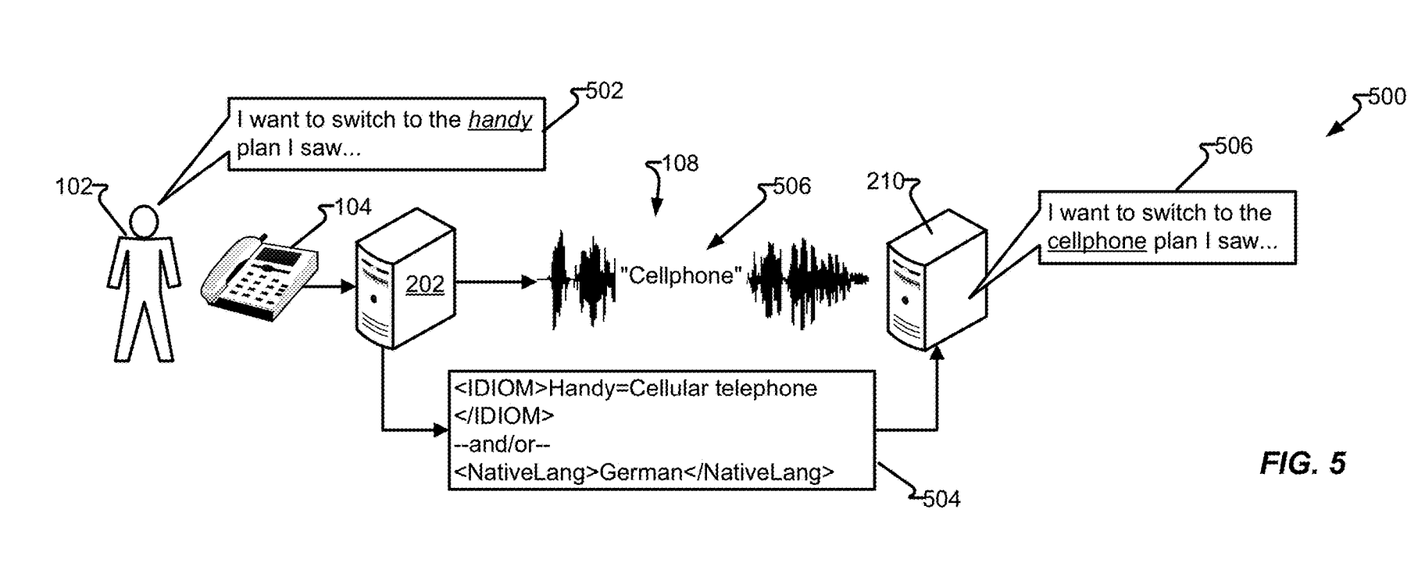
FIG. 5 depicts a fifth interaction in accordance with embodiments of the present disclosure.

FIG. 5 depicts interaction 500 in accordance with embodiments of the present disclosure. In one embodiment, user 102 provides spoken content 502, which may comprise an idiom or other language attribute, such as a regional variation in phrasing or terminology. For example, user 102 may speak English but be a native German speaker and utilize the word "handy" as the familiar word for cellular telephone. Speech attribute 504 may comprise an indicator associated with the speaker, such as an indication that their native language is German, thereby allowing destination server 210 to apply an idiom translation to the speech received via waveform 108.

In another embodiment, speech attribute 504 may detect the idiom, such as by speech recognition performed by source server 202, and provide the substitute meaning of the idiom to destination server 210. In yet another embodiment, source server 202 may insert a machine-generated idiom translation to be provided in waveform 108. Destination server 210 may then process recognized speech 506 with idioms converted into a readily usable form without requiring additional processing.

Figure 6:
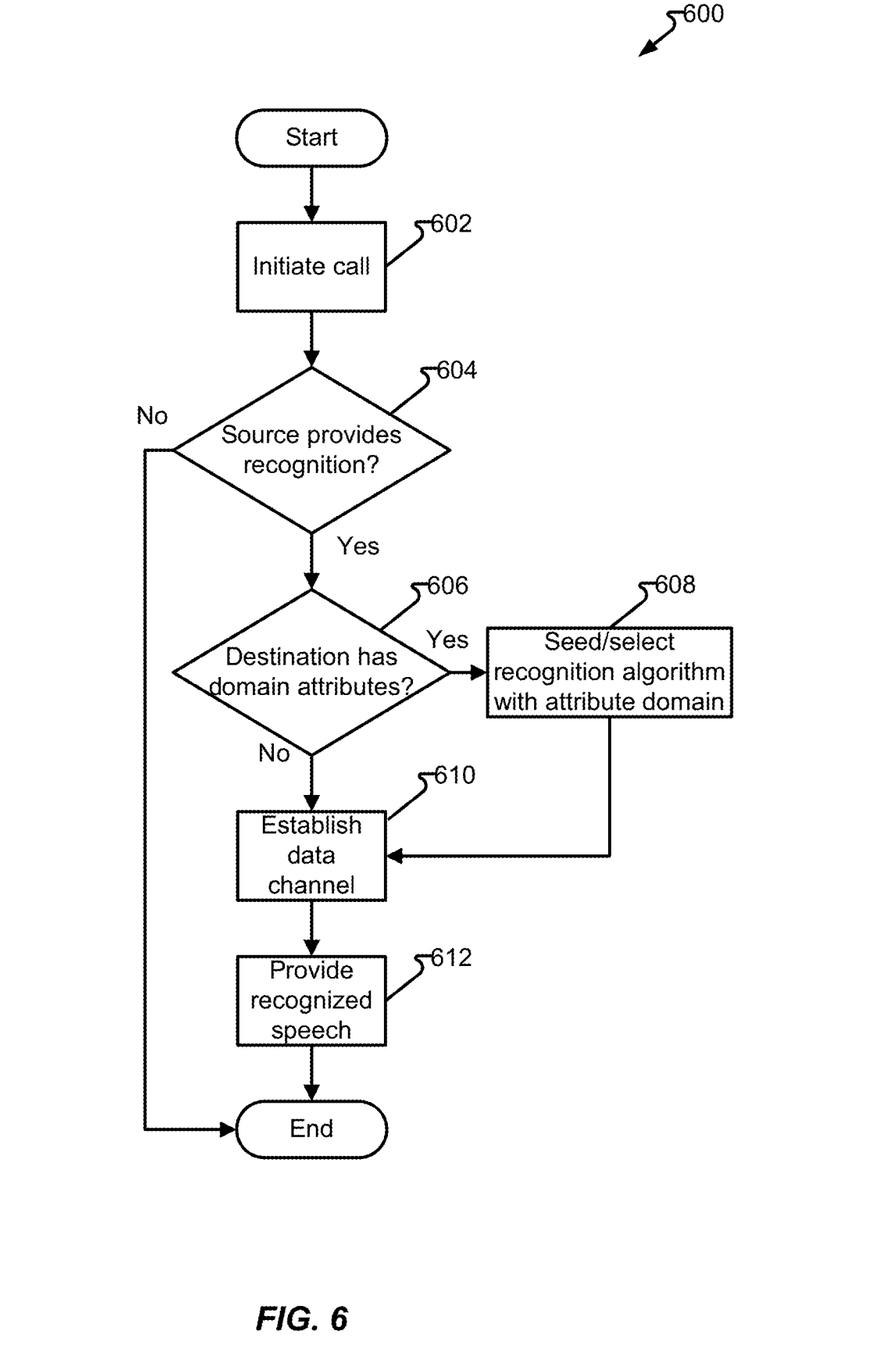
FIG. 6 depicts a method in accordance with embodiments of the present disclosure.

FIG. 6 depicts method 600 in accordance with embodiments of the present disclosure. In one embodiment, process 600 begins at step 602 whereby a call is initiated between two endpoints. One endpoint may be a user device, such as device 104, utilized by user 102. Step 602 may comprise a SIP INVITE message or other call initiation message. Next, step 604 determines if the source provides call recognition; the source being associated with the user providing spoken content to be recognized.

Step 604 may provide an indicator, such as may be received by destination component (e.g., destination server 110). Alternatively, the destination component may inquire to the source (source device and/or source server) or otherwise request that source-based speech recognition services be provided. If step 604 is determined in the negative, process 600 may end, whereby speech recognition is handled on the destination side, such as by destination server 110, or the call is routed to a human agent.

If step 604 is determined in the affirmative, processing may continue to step 606 whereby determination is made whether the destination has domain attributes available. Alternatively, step 606 may be performed by the destination server providing destination attributes without being prompted. If step 606 is determined in the affirmative step 608 is performed, whereby a speech recognition algorithm provided by the source server is selected and/or seated in accordance with domain attributes received from the destination server. For example, if the user places a call to an airline reservation system, the destination server may provide attributes associated with air travel (e.g., <domain>Airline</domain>), which may further include individual vocabulary words, to assist the source server and more accurately and/or efficiently recognize the speech associated with the call. After step 606, or upon step 606 being determined in the negative, processing continues to step 610.

Step 610, if not otherwise established, establishes a data channel for the exchange of data associated with spoken content. Next, step 612 provides recognized speech from the source server to the destination server. Upon completion of the call, process 600 may end. Step 610, in one embodiment, provides speech attributes allowing for the tuning of speech recognition by the destination server. Alternatively, step 610 provides recognized speech to the destination server. In an additional alternative embodiment, step 610 provides recognized speech as tuned by attribute domain information received in step 608 to the destination server.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including, but not limited to, wireless, wireline, optical fiber cable, RF, etc., or any suitable combination of the foregoing.

While illustrative embodiments of the disclosure have been described in detail herein, it is to be understood that the inventive concepts may be otherwise variously embodied and employed and that the appended claims are intended to be construed to include such variations, except as limited by the prior art.

What is claimed is:

1. A destination server, comprising:
    a network interface to a communications network;
    a microprocessor having access to the network interface; and
    the microprocessor that, via the network interface, engages in a call with a source server, the call comprising a voice channel comprising a spoken portion provided by a source user and a data channel comprising a machine-readable cue of the spoken portion and wherein the machine-readable cue comprises a speech attribute of the source user;
    wherein the microprocessor executes a speech recognition algorithm to recognize the spoken portion and wherein the speech recognition algorithm is seeded with the machine-readable cue; and
    wherein the microprocessor executes instructions in accordance with the microprocessor recognized spoken portion on the voice channel and the machine-readable cue received on the data channel.

2. The destination server of claim 1, wherein the microprocessor receives indicia of source-side speech recognition.

3. The destination server of claim 2, wherein the microprocessor, in response to receiving the indicia of source-side speech recognition, replies via the data channel with a domain attribute associated with the destination server.

4. The destination server of claim 1, wherein the microprocessor executes a speech recognition algorithm utilizing an acoustic model, selected in accordance with the speech attribute of the source user in the machine-readable cue, and derives machine-readable content from a waveform portion of the call.

5. The destination server of claim 1, wherein the machine-readable cue further comprises human-readable text of a machine-readable recognition of the spoken portion.

6. The destination server of claim 1, wherein the data channel comprises a Real-Time Transport Protocol (RTP) text stream.

* * * * *